United States Patent
Shibagaki et al.

(10) Patent No.: US 6,814,562 B2
(45) Date of Patent: Nov. 9, 2004

(54) APPARATUS FOR MOLDING A HONEYCOMB STRUCTURE

(75) Inventors: Yukinari Shibagaki, Nagoya (JP); Takeyuki Ishii, Nagoya (JP); Yoshimasa Kondo, Nagoya (JP)

(73) Assignee: NGK Insulators, Ltd. (JP)

(*) Notice: Subject to any disclaimer, the term of this patent is extended or adjusted under 35 U.S.C. 154(b) by 183 days.

(21) Appl. No.: 10/102,734

(22) Filed: Mar. 22, 2002

(65) Prior Publication Data

US 2002/0185776 A1 Dec. 12, 2002

(30) Foreign Application Priority Data

Mar. 28, 2001 (JP) .................................. 2001-093438

(51) Int. Cl.[7] .............................................. B29C 47/82
(52) U.S. Cl. ............................. 425/382 R; 264/177.12; 425/463; 425/467
(58) Field of Search ..................... 425/380, 382 R, 425/463, 467; 264/177.12

(56) References Cited

U.S. PATENT DOCUMENTS

| | | | | | |
|---|---|---|---|---|---|
| 4,298,328 A | * | 11/1981 | Frost | .......................... | 425/380 |
| 4,381,912 A | * | 5/1983 | Yamamoto et al. | ......... | 425/380 |
| 5,238,386 A | * | 8/1993 | Cunningham et al. | ...... | 425/467 |
| 5,876,804 A | * | 3/1999 | Kodama et al. | ............ | 425/463 |
| 5,906,839 A | * | 5/1999 | Miura et al. | ................. | 425/467 |
| 5,942,260 A | * | 8/1999 | Kodama et al. | ............ | 425/467 |
| 6,652,257 B2 | * | 11/2003 | Yamaguchi et al. | ........ | 425/467 |
| 6,696,132 B2 | * | 2/2004 | Beall et al. | ................. | 425/463 |

FOREIGN PATENT DOCUMENTS

JP 57-157706 9/1982

* cited by examiner

*Primary Examiner*—Tim Heitbrink
(74) *Attorney, Agent, or Firm*—Parkhurst & Wendel, L.L.P.

(57) ABSTRACT

A honeycomb structure molding apparatus being free from defects in cells and having a higher strength with thin partition walls forming the cells and having a small cell density; and the apparatus having a plate-like spinneret provided with back pores for introducing a molding material and slits for extruding the molding material, and a press plate for fixing spinneret, the spinneret comprising an inner side and outer peripheral parts, the inner side part protruding downstream to form a level difference part therebetween, the press plate opening opposing the inner side part of the spinneret and presses the outer peripheral part of the spinneret downstream, and width W (mm) of slits, length L 1 (mm) of slits of the inner side part and length L 2 (mm) of slits of the outer peripheral part satisfying following two formulas:

$L1-L2 \geq 0.4$ mm $L2 \geq 0.015/W \times L1$.

7 Claims, 7 Drawing Sheets

APPARATUS FOR MOLDING A HONEYCOMB STRUCTURE

BACKGROUND OF THE INVENTION

The present invention relates to an apparatus for molding a honeycomb structure, a spinneret for extrusion, and a method for molding a honeycomb structure.

Problems which become afresh are influences on earth environments and ecosystems of nitrogen oxides, sulfur oxides, hydrogen chloride, etc. contained in exhaust gases of automobiles in addition to carbon dioxide which warms the earth. It is said that, in the future, automobiles which utilize as energy source, for example, electricity, natural gas or methanol which have less influences on the ecosystem will be substituted for automobiles which utilize gasoline and gas oil as energy source. However, there are difficulties to overcome for practical use of these technologies, and tentative measures are reduction of cost of fuels and purification of exhaust gases. The honeycomb structures are used for exhaust gas purification apparatuses of automobiles as a technology for the solution of environmental problems.

For example, honeycomb structures made of ceramics materials or metallic materials as shown in FIGS. 2–4 are used as catalyst carriers for exhaust gas purification apparatuses of automobiles. FIG. 3 is an oblique view of a honeycomb structure 61, FIG. 4 is a front view of the honeycomb structure 61, and FIG. 2 is a partially enlarged view of the honeycomb structure 61. This honeycomb structure 61 is generally columnar as shown in FIG. 3, and comprises partition walls 64 having a honeycomb structure which form many cells 63 and an outer wall 62 covering the outer periphery.

For making such honeycomb structure 61, an apparatus for molding honeycomb structures, for example, as shown in FIG. 5, is used. FIG. 5 is a vertical sectional view of an apparatus for molding honeycomb structure which is provided with back pores 53 from which a molding material is introduced, a spinneret 54 having slits 52 through which the molding material is extruded, and a press plate 55 provided downstream the spinneret 54. Extrusion molding is carried out using this apparatus to make the honeycomb structure 61.

In the honeycomb structure molding apparatus 50, the spinneret 54 comprises an inner side part 71 and an outer periphery part 72, and the inner side part 71 protrudes to downstream side to form a level difference part 75 between the inner side part 71 and the outer periphery part 72. The inner side part 71 is provided with slits 73 by which a honeycomb structure is molded, and the outer peripheral part 72 is provided with slits 74 shorter than the slits 73. Furthermore, a gap part 57 which molds the outer wall of the honeycomb structure is provided between the spinneret 54 and the press plate 55. Press jig 58 and back press plate 59 are holders for setting the spinneret 54 and the press plate 55.

In carrying out extrusion molding by the honeycomb structure molding apparatus 50, the molding material is extruded from the upstream side of spinneret 54 to the downstream side through the spinneret 54 by an extruder (not shown) as shown in FIG. 5. The molding material extruded from slits 73 provided in the inner side part 71 of the spinneret 54 which opens on the downstream side forms a honeycomb structure comprising many cells 63.

On the other hand, the molding material extruded from slits 74 provided in the outer peripheral part 72 of the spinneret 54 flows with changing its running direction to the level difference part 75 from the extrusion direction with rupturing the honeycomb shape by the action of the gap part 57, and again flows with changing its running direction to the extrusion direction at the position where the press plate 55 opens, thereby forming an outer wall 62 surrounding the cells 63.

However, in such conventional honeycomb structure molding apparatus and molding method, there is the problem of failure in formation of cells.

As examples of failure in formation of cells, mention may be made of twist or rupture of cells as shown in FIG. 11. In the honeycomb structure molding apparatus shown in FIG. 5, there are problems that when the molding material for forming an outer wall flows with changing its running direction to the extrusion direction at the opening of the press plate 55, an excessive force is applied to the molding material for forming the cells in the outer peripheral part 72 to bring about twist of cells 94 or rupture of cells 93. Another example is omission of cells as shown in FIGS. 6 and 7. FIG. 6 is a front view of a honeycomb structure from which some cells are omitted, and FIG. 7 is an enlarged view of the portion in which omission of cells occurred in FIG. 6. Many cell omission portions 92 in the honeycomb structure 91 are seen in the direction of 90° in the vicinity of the outer wall 62, and it is presumed that this phenomenon occurs because a molding material which is originally to form the partition wall 64 flows to the outer wall portion 62 at the time of being extruded from the spinneret.

The omission of cells means a phenomenon that one or more of partition walls which form cells 63 are not formed. The direction of 90° at the section of the honeycomb structure means a direction progressing along the crossing partition walls 64 from nearly the center of the section of the honeycomb structure.

If failure in formation of cells occurs, strength of the honeycomb structure is deteriorated, and this is not preferred. Furthermore, when cells are closed in the form of checks and the honeycomb structure is used as a filter for apparatus for purification of exhaust gas of automobiles, there are portions which do not have filtration function to cause deterioration of performance. Moreover, when the honeycomb structure is used as catalyst carriers of automobile exhaust gas purification apparatus, recently, not only the exhaust gas purification performance is required, but also it is demanded to make the cell density as small as possible and the partition walls forming the cells as thin as possible for inhibition of deterioration of horse-power of automobiles. A honeycomb structure composed of a small number of cells thin in wall thickness is apt to be low in strength from the point of structure, and hence occurrence of failure in formation of cells which causes further deterioration of strength must be prevented by any means.

For the purpose of improving the strength of honeycomb structures, measures have hitherto been proposed.

For example, JP-A-57-157706 discloses various dies for honeycomb molding. FIGS. 8–10 are sectional views showing examples of the disclosed dies for honeycomb molding. Outer peripheral part of edge face of outlet side for a molding material of die 202 (spinneret) is cut out to form a step-like part 223 at the whole periphery, a level difference part 224 is provided between the central part of the edge face of outlet side for the molding material and the outer peripheral part of the die 202, and a ring space 204 is provided between the level difference part 224 and an inner peripheral face 231 of a die mask 203 (press plate) opposing and surrounding the level difference part 224.

In die 198 for honeycomb molding having a level difference part 224 of tapered angle as shown in FIG. 8, the molding material going in centripetal direction from molding channel 221 (slit) in the outer peripheral part of the die 202 is extruded after forcedly fed to the molding channel 221 in the central part of the die 202, and, hence, no pressure is applied to the portion near the peripheral wall (outer wall) of the already molded honeycomb body and no distortion is caused at the partition walls near the peripheral wall of the resulting honeycomb molded body. Furthermore, since the molding material filled in the space 204 flows together with the molding material coming straight from the molding channel 221 below the space 204 and is extruded along the inner peripheral face 231 of the die mask 203, a thick and dense peripheral wall is formed at the outer periphery of the resulting honeycomb molded body. Therefore, a honeycomb molded body of high strength can be obtained.

Furthermore, in a die 199 for honeycomb molding in which a space 205 is provided between an edge face 232 of the die mask 203 and the step-like part 223 of the die 202 which is opposite to the edge face 232 as shown in FIG. 9, density of the molding material fed under pressure from the molding channel 221 of the step-like part 223 and the space 205 to the molding channel of the central part and space 204 is smaller than in the case of using the die 198 for honeycomb molding, and, hence, the density of the molding material at the partition wall of piercing pores (cells) and the peripheral wall becomes uniform, whereby strength against heat shock can be improved.

Furthermore, in a die 200 for honeycomb molding in which the level difference part 223 is not tapered, but forms a face parallel with the inner peripheral face 231 of the die mask 203, and a space 204 is provided between these opposing faces as shown in FIG. 10, the same effects as in the case of the die 198 for honeycomb molding can be obtained.

However, there are no disclosures as to whether the failure in formation of cells as mentioned above, namely, twisting of cells, rupture of cells and omission of cells can be inhibited or not.

SUMMARY OF THE INVENTION

The object of the present invention is to provide a honeycomb structure molding apparatus according to which failure in formation of cells such as omission of cells can be inhibited, and, as a result, a higher strength can be given to even such honeycomb structure as having thin partition walls forming the cells and having a small cell density, and a molding method using said apparatus.

As a result of research conducted on honeycomb molding apparatuses, particularly, periphery of spinneret, for inhibiting occurrence of the above failure in formation of cells, it has been found especially effective to optimize the height of the level difference part of the spinneret. That is, if the height of the level difference part is too low, the molding material for the formation of outer wall gives an excessive force to the molding material for the formation of cells when they contact with and bond to each other to result in twist of cells and rupture of cells. If the height of the level difference part is too high, a part of the molding material for the formation of cells which is to be allowed to contact with the molding material for the formation of outer wall does not flows through the slits to cause omission of cells.

Therefore, according to the present invention, there is provided a honeycomb structure molding apparatus for making a honeycomb structure by extrusion molding, characterized in that it has at least a plate-like spinneret provided with back pores for introducing a molding material and slits for extruding the molding material, and a press plate for fixing the spinneret, the spinneret comprises an inner side part and an outer peripheral part, the inner side part protrudes to the downstream side to form a level difference part between the inner side part and the outer peripheral part, the press plate opens opposing the inner side part of the spinneret and presses the downstream side of the outer peripheral part of the spinneret, and width W (mm) of slit, length L1 (mm) of slit of the inner side part and length L2 (mm) of slit of the outer peripheral part satisfy the following two formulas.

$$L1-L2 \geq 0.4 \text{ mm}$$

$$L2 \geq 0.015/W \times L1$$

In the honeycomb structure molding apparatus of the present invention, the level difference part is preferably right-angled with having an inclined plane of about 90°. The width W of the slits is preferably about 120 μm or less.

The honeycomb structure molding apparatus of the present invention can be suitably used for molding a honeycomb structure having a cell density of about 2.0 cells/cm² or less, and, besides, can easily mold a honeycomb structure having a thick outer wall of about 0.3 mm or more in thickness.

Moreover, the honeycomb structure made by the honeycomb structure molding apparatus of the present invention can be suitably used as catalyst carriers for purification of exhaust gases of automobiles.

According to the present invention, there is provided a plate-like spinneret for extrusion molding a honeycomb structure which is provided with back pores for introducing a molding material and slits for extruding the molding material, characterized in that the spinneret comprises an inner side part and an outer peripheral part, the inner side part protrudes to the downstream side to form a level difference part between the inner side part and the outer peripheral part, and width W (mm) of slit, length L1 (mm) of slit of the inner side part and length L2 (mm) of slit of the outer peripheral part satisfy the following two formulas.

$$L1-L2 \geq 0.4 \text{ mm}$$

$$L2 \geq 0.015/W \times L1$$

Furthermore, according to the present invention, there is provided a honeycomb structure molding method for obtaining a honeycomb structure by extrusion molding a molding material containing at least a ceramics powder and/or a metallic powder and a molding aid, characterized in that there is used a spinneret jig for extrusion of a honeycomb structure which has a plate-like spinneret provided with back pores for introducing a molding material and slits for extruding the molding material, and a press plate for fixing the spinneret, the spinneret comprising an inner side part and an outer peripheral part, the inner side part protruding to the downstream side to form a level difference part between the inner side part and the outer peripheral part, the press plate opening opposing the inner side part of the spinneret and pressing the downstream side of the outer peripheral part of the spinneret, the level difference part being right-angled with an inclined plane of about 90°, and by specifying the height of the level difference part to be about 0.5–4 mm, the difference in passage resistance between the slits of the inner side part and those of the outer side part is reduced and thus failure in formation of cells can be inhibited.

Figure 1:
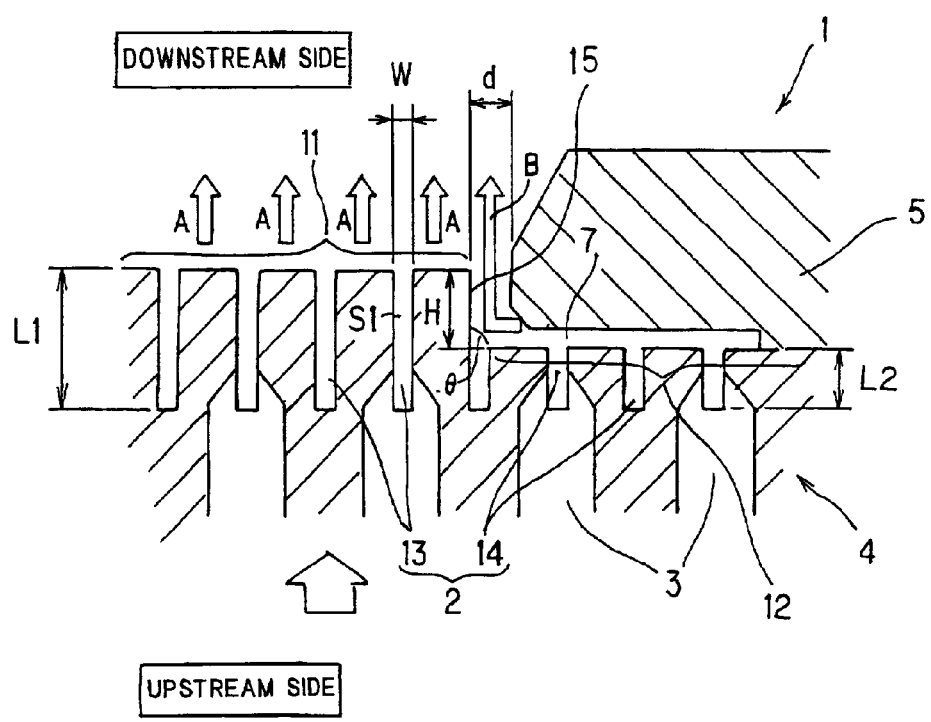
FIG. 1 is a partial sectional view showing one example of the honeycomb structure molding apparatus of the present invention.
Figure 2:
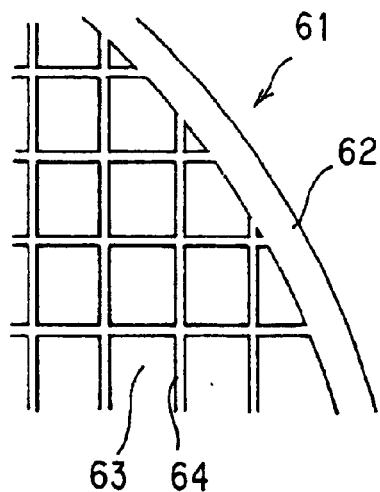
FIG. 2 is a partially enlarged view showing an example of a honeycomb structure.
Figure 3:
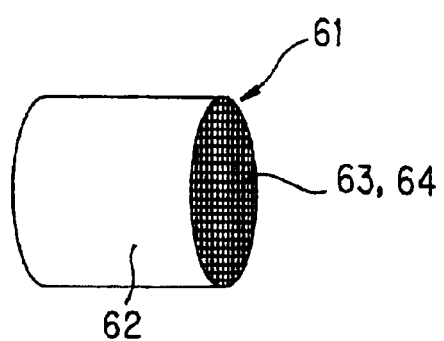
FIG. 3 is an oblique view showing an example of a honeycomb structure.
Figure 4:
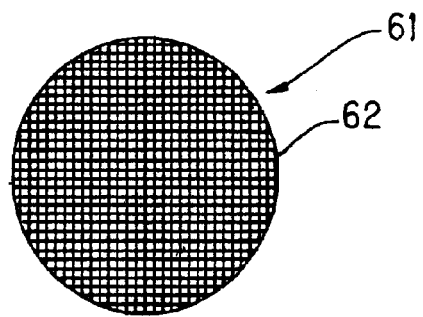
FIG. 4 is a front view showing one example of a honeycomb structure.

Reference numerals in the drawings have the following meanings.

1—Honeycomb structure molding apparatus, 2—Slit, 3—Back pore, 4, 41—Spinneret, 5—Press plate, 7—Gap part, 11—Inner side part, 12—Outer peripheral part, 13—Slit (inner side part), 14—Slit (outer peripheral part), 15, 16—Level difference part, 50—Honeycomb structure molding apparatus (conventional), 52—Slit, 53—Back pore, 54—Spinneret, 55—Press plate, 57—Gap part, 58—Press jig, 59—Back press plate, 61—Honeycomb structure, 62—Outer wall, 63—Cell, 64—Partition wall, 71—Inner side part, 72—Outer peripheral part, 73—Slit (inner side part), 74—Slit (outer peripheral part), 75—Level difference part, 91—Honeycomb structure, 92—Cell omission portion, 93—Cell rupture portion, 94—Cell twist portion, 198—Die for honeycomb molding, 199—Die for honeycomb molding, 200—Die for honeycomb molding, 202—Die, 203—Die mask, 204—Gap, 205—Gap, 221—molding channel, 223—Step-like part, 224—Level difference part, 231—Inner peripheral face, 232—Edge face.

DESCRIPTION OF THE PREFERRED EMBODIMENTS

The honeycomb structure molding apparatus of the present invention will be specifically explained by the following embodiments, but these embodiments should never be construed as limiting the invention and various variations, modifications and improvements can be made without departing from the scope of the invention.

The present invention relates to a honeycomb structure molding apparatus according to which failure in formation of cells such as omission of cells can be inhibited, and reduction of strength is inhibited, and a honeycomb structure having cells of even low density and thin wall desired for purification apparatuses for exhaust gas of automobiles can be molded, a spinneret jig used for the apparatus, and a method for molding honeycomb structure.

The present invention is characterized in that width W (mm) of slits, length L1 (mm) of slits of the inner side part and length L2 (mm) of slits of the outer peripheral part in a spinneret satisfy the following two formulas.

$$L1-L2 \geq 0.4 \, mm \quad (1)$$

$$L2 \geq 0.015/W \times L1 \quad (2)$$

These two formulas limit the height of the level difference part by the width W of slit, the length L1 of slit of the inner side part and the length L2 of slit of the outer peripheral part in the spinneret. By using a spinneret in which the height of the level difference part is within this range, the molding material introduced from the downstream side of the back pores of the spinneret is uniformly extruded through the whole slits of the inner side part of the spinneret, and hence failure in formation of cells does not occur.

Since in the spinneret, the longer slit length L1 of the inner side part and the shorter slit length L2 of the outer peripheral part differ from each other, there is present a difference in passage resistance between the slits of the inner side part and outer peripheral part when the molding material flows, but if the height of the level difference part is large outside the formulas (1) and (2), the molding material which flows through the slit of inner side part near the outer peripheral part flows toward the slit of the outer peripheral part which is shorter in slit length and smaller in passage resistance, namely, through which the molding material easily flows and which is present close to the slits of the inner side part. As a result, the molding material does not flow through the slits of the inner side part near the outer peripheral part to cause omission of cells.

It was confirmed that when the height of the level difference part satisfies the above formulas (1) and (2), difference in passage resistance between the slits of the inner side part and outer peripheral part can be restrained to such an extent that the molding material which flows through the slits of the inner side part near the outer peripheral part cannot flows to the slits of outer peripheral part. Therefore, failure in formation of cells can be inhibited.

If the height of the level difference part is small outside the formulas (1) and (2), the molding material which flows through the slits of the outer peripheral part, namely, the molding material for forming the outer wall, applies an excessive force to the molding material for forming the cells when the molding material for forming the outer wall contacts with the molding material for forming the cells, thereby causing twisted cells and rupture of cells.

In the present invention, it is preferred that the angle of inclination of the level difference part is nearly right angle, namely, 90°. Thus, adhesion of the outer wall and cells increases, and the honeycomb structure molded by the honeycomb structure molding apparatus of the present invention is further increased in strength.

The honeycomb structure molding apparatus of the present invention will be explained referring to the drawings.

Figure 5:
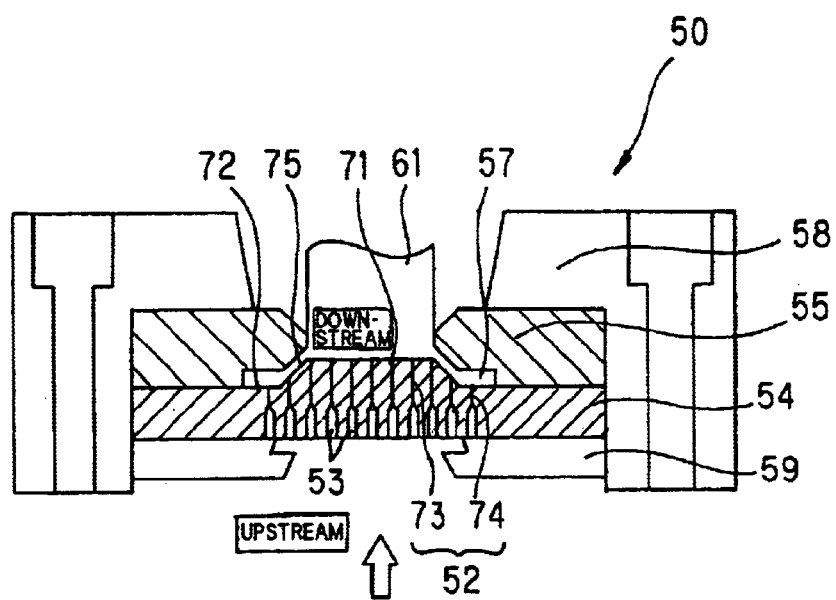
FIG. 5 is a sectional view showing one example of a conventional honeycomb structure molding apparatus.
Figure 6:
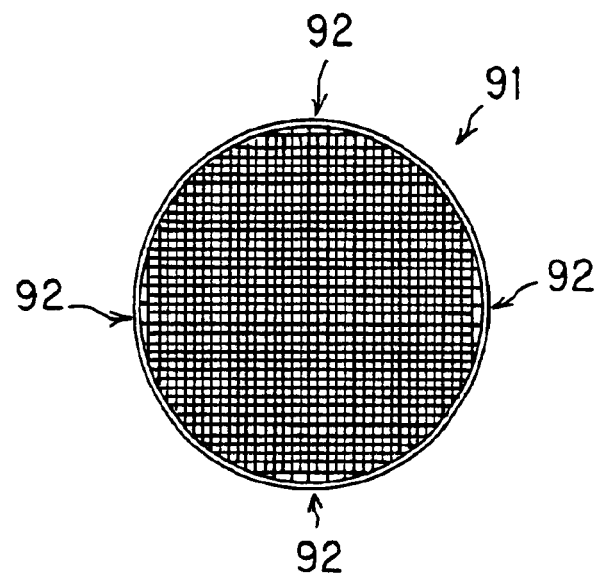
FIG. 6 is a sectional view showing an example of failure in formation of cells of a honeycomb structure.

FIG. 1 is a partial sectional view showing one example of the honeycomb structure molding apparatus of the present invention. Although the whole construction is not shown, it is the same as the conventional honeycomb structure molding apparatus 50 shown in FIG. 5.

The honeycomb structure molding apparatus 1 is an apparatus for making a honeycomb structure using as a molding material, for example, one or both of a ceramics powder and a metallic powder which are mixed with a molding aid. The honeycomb structure molding apparatus 1 has a spinneret 4 provided with back pores 3 for introduction of the molding material and slits 2 for extruding the molding material. The spinneret 4 comprises an inner side part 11 and an outer peripheral part 12, and is fixed by a press plate 5 at the outer peripheral part 12 on the downstream side.

The inner side part 11 of the spinneret 4 protrudes to the downstream side to form a level difference part 15 between the inner side part 11 and the outer peripheral part 12. In more detail, the slits 2 provided at the spinneret 4 comprise slits 13 provided at the inner side part 11 and slits 14 provided at the outer peripheral part 12. The press plate 5 is opened at the portion of downstream side opposite to the inner side part 11, namely, nearly the central portion of the press plate 5 is opened, and simultaneously the press plate presses the downstream side of the outer peripheral part 12 of the spinneret 4 through a gap part 7.

In the honeycomb structure molding apparatus 1, the difference in the height of the inner side part 11 and that of the outer peripheral part 12 of the spinneret 4, namely, the height of the level difference part H (H=L1−L2) is set at the height which satisfies the following two formulas:

$$L1-L2 \geq 0.4 \text{ mm} \quad (1)$$

$$L2 \geq 0.015/W \times L1 \quad (2)$$

which are shown by the width W (mm) of slit 2, length L1 (mm) of slit 13 and length L2 (mm) of slit 14. Moreover, as shown in FIG. 1, it is preferred that the level difference part 15 is formed as nearly a vertical plane, and the angle θ made by the face of the level difference part 15 and that of the outer peripheral part 12 is about 90°.

In the honeycomb structure molding apparatus 1 of the present invention, a molding material is extruded from the upstream side of the spinneret 4 to the downstream side through the spinneret 4 by an extruder (not shown) as in the case of conventional apparatus. The molding material extruded from slits 13 provided at the inner side part 11 of the spinneret 4, the downstream side of which is opened, forms a honeycomb structure comprising many cells.

On the other hand, the molding material extruded from slits 14 provided at the outer peripheral part 12 of the spinneret 4 flows changing its progressing direction from the extrusion direction to the direction of the level difference part 15 with the honeycomb shape being ruptured by the action of the gap part 7 and flows again changing its progressing direction to the extrusion direction at the level difference part 15, thereby forming an outer wall which surrounds the cells.

In the honeycomb structure molding apparatus 1 of the present invention, if the height H of the level difference part is too small, the molding material for forming the outer wall which flows through the slits 14 gives an excessive force to the molding material for forming the cells which flows through the slits 13 when the former molding material contacts with the latter molding material, thereby causing twisted cells and rupture of cells. If the height H of the level difference part is too large, a part of the molding material for forming the outer wall which should contact with the molding material for forming the outer wall which flows through the slits 14 does not flows through the slits 13, thereby causing omission of cells. The molding material which should properly flow through the silts 13 of the inner side part 11 near the outer periphery part 12, in more detail, the slits S1, can be inhibited from flowing to the side of slits 14 of the outer peripheral part 12 which are shorter in length and smaller in passage resistance and from being extruded to the downstream side. Therefore, the molding material is extruded in the direction shown by arrow A without being one-sided, and partition walls of the cells are completely formed and omission of cells hardly occurs.

In this case, if the angle θ of the level difference part is nearly right angle, the molding material extruded through slits 14 of the outer periphery part 12 is smoothly changed to the direction indicated by arrow B and, hence, the thickness of the outer wall can be controlled to the length d of the gap on the most downstream side between the level difference part 15 and the press plate 5. As a result, a honeycomb structure having a uniform and thick outer wall of about 0.3 mm or more and further improved in strength can be easily molded.

In this way, according to the present invention, since the molding material is stably extruded from each slit in the directions of the arrows A and B, adhesion between cell and outer wall increases and a honeycomb structure of higher strength can be obtained. Moreover, occurrence of twist of both the outer wall and the partition wall forming the cells can be inhibited.

Therefore, a honeycomb structure having cells of thin wall in which the partition wall is formed by extruding the molding material from narrow slits of the inner side part 11 which have a slit width W of about 120 μm or less can be easily molded. Moreover, a honeycomb structure having a coarse cell density of about 2.0 cells/mm² or less can be made with high strength.

The present invention will be explained in more detail by the following examples, which should not be construed as limiting the invention in any manner.

Figure 7:
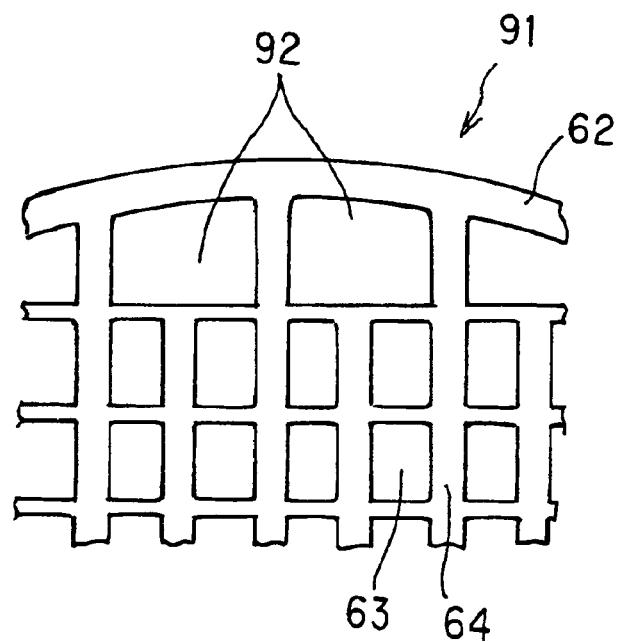
FIG. 7 is a partially enlarged view showing an example of failure in formation of cells of a honeycomb structure.
Figure 8:
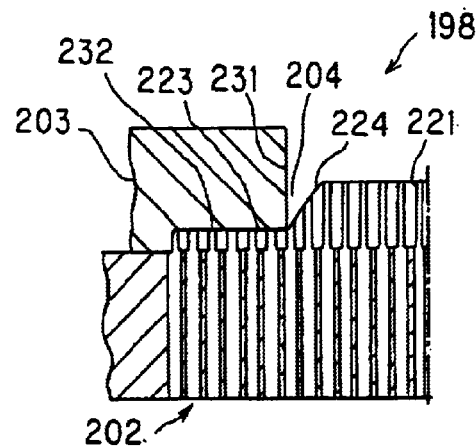
FIG. 8 is a sectional view showing an example of conventional honeycomb molding die.
Figure 9:
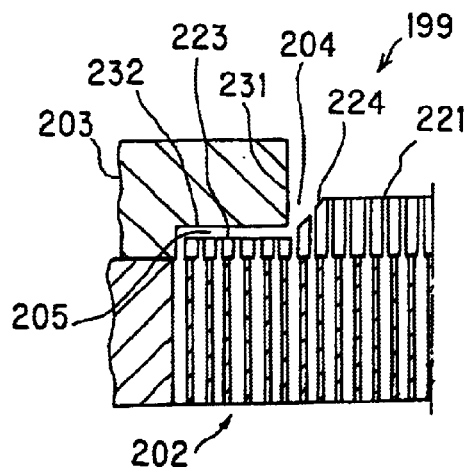
FIG. 9 is a sectional view showing an example of conventional honeycomb molding die.
Figure 10:
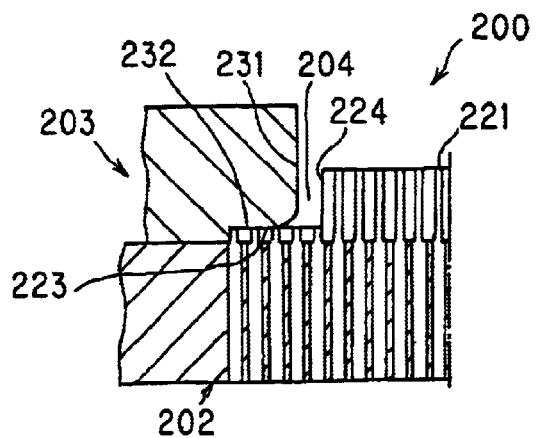
FIG. 10 is a sectional view showing an example of conventional honeycomb molding die.
Figure 11:
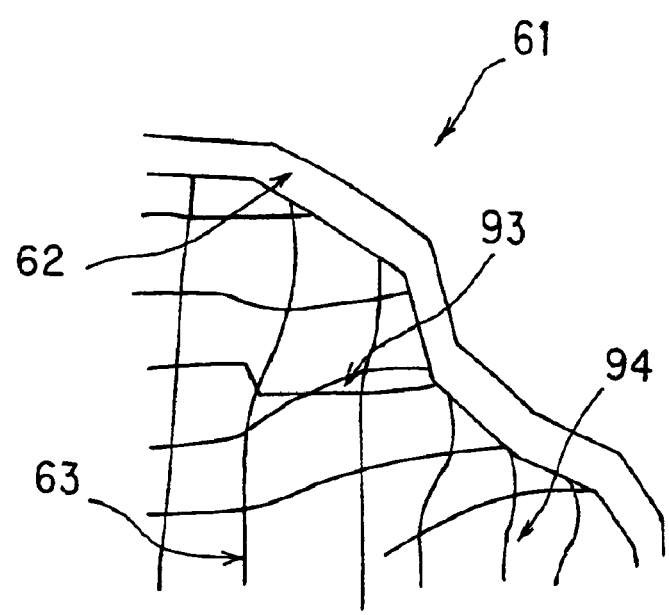
FIG. 11 is a partially enlarged view showing another example of failure in formation of cells of a honeycomb structure.

Failure in formation of outer wall in the molding step of each example was evaluated in the following manner. (Method of evaluation on failure in formation of cells) A molded article was extruded from an extrusion molding machine (not shown), and the state of cells was observed to examine whether failure in formation of cells such as twist of cells and rupture of cells as shown in FIG. 11, or omission of cells as shown in FIG. 7 occurred or not.

The molding materials for extrusion molding were prepared in the following manner.

(Method for Preparation of Molding Material)

In order to make a cordierite honeycomb structure, given amounts of talc, kaolin and aluminum hydroxide shown in Table 1 as starting materials were weighed, respectively, and they were mixed to obtain a starting material batch. Next, as a kneading step, to 100% by weight of the resulting starting material batch were added 4% by weight of methyl cellulose and addition water, followed by carrying out kneading by a kneading apparatus (not shown) to obtain a kneaded product. At this kneading step, temperature of the kneading apparatus was controlled so that the temperature of the kneaded product reached 10° C. Then, the resulting kneaded product was deaerated by passing through a vacuum chamber and re-kneaded to prepare a columnar molding material. This columnar molding material was put in an extrusion molding machine and extruded to obtain a cordierite honeycomb structure.

TABLE 1

| Raw materials | Average particle diameter (μm) | Chemical analysis value (%) | | | | | | |
|---|---|---|---|---|---|---|---|---|
| | | Ignition loss | SiO$_2$ | Al$_2$O$_3$ | MgO | TiO$_2$ | Fe$_2$O$_3$ | CaO + Na$_2$O + K$_2$O |
| Talc | 6.7 | 5.2 | 61.7 | 0.4 | 30.7 | — | 1.3 | 0.2 |
| Kaolin | 21.3 | 13.5 | 45.5 | 38.5 | — | 1.3 | 0.5 | 0.1 |
| Al(OH)$_3$ | 0.6 | 34 | — | 65.6 | — | — | — | 0.3 |

EXAMPLE 1

Figure 12:
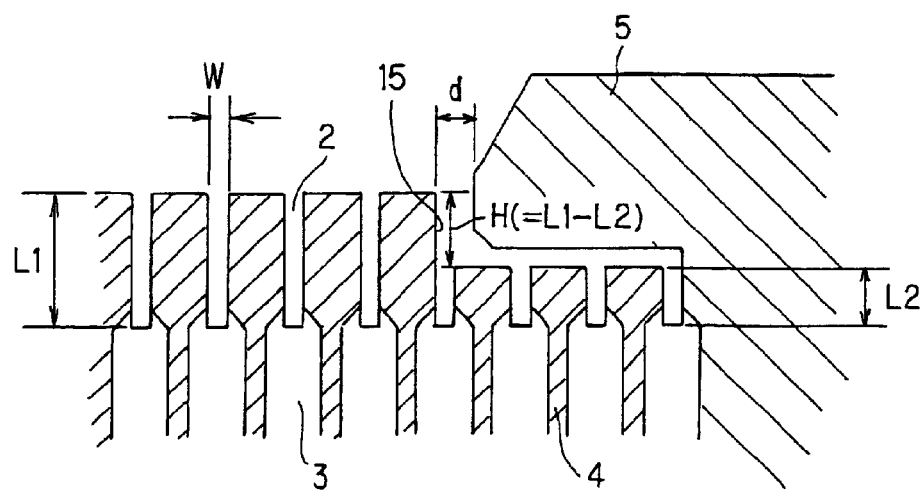
FIG. 12 is a partial sectional view of the honeycomb structure molding apparatus used in Examples and Comparative Examples other than Example 7 and Comparative Example 7 in which the level difference part has a vertical plane of about 90°.

Extrusion molding was carried out using the resulting molding material by a honeycomb structure molding apparatus as shown in FIG. 12 provided with a spinneret 4 having the level difference part 15 having a vertical plane of about 90° and the press plate 5, with setting the spinneret 4 and the press plate 5 so that the gap width d between the level difference part 15 and the press plate 5 on the most downstream side was 0.35 mm, and evaluation on failure in formation of cells was conducted.

As for slits 2 provided in the spinneret 4, the slit width W was 0.050 mm, the slit length L1 of the inner side part was 3.0 mm, and the slit length L2 of the outer periphery part was 1.0 mm, and cell density of the resulting molded body was 0.65 cell/mm$^2$.

EXAMPLE 2

Extrusion molding was carried out in the same manner as in Example 1, except that the slit length L2 of the outer periphery part of slit 2 provided in the spinneret 4 was 2.0 mm, and evaluation on failure in formation of cells was conducted.

EXAMPLE 3

Extrusion molding was carried out in the same manner as in Example 1, except that the slit width W of the slit 2 provided in the spinneret 4 was 0.075 mm, and the slit length L2 of the outer periphery part of slit 2 provided in the spinneret 4 was 0.8 mm, and evaluation on failure in formation of cells was conducted.

EXAMPLE 4

Extrusion molding was carried out in the same manner as in Example 1, except that the slit width W of the slit 2 provided in the spinneret 4 was 0.075 mm, and the slit length L2 of the outer periphery part was 2.0 mm, and evaluation on failure in formation of cells was conducted.

EXAMPLE 5

Extrusion molding was carried out in the same manner as in Example 1, except that the slit width W of the slit 2 provided in the spinneret 4 was 0.100 mm, and the slit length L2 of the outer periphery part was 0.6 mm, and evaluation on failure in formation of cells was conducted.

EXAMPLE 6

Extrusion molding was carried out in the same manner as in Example 1, except that the slit width W of the slit 2 provided in the spinneret 4 was 0.100 mm, and the slit length L2 of the outer periphery part was 2.0 mm, and evaluation on failure in formation of cells was conducted.

EXAMPLE 7

Figure 13:
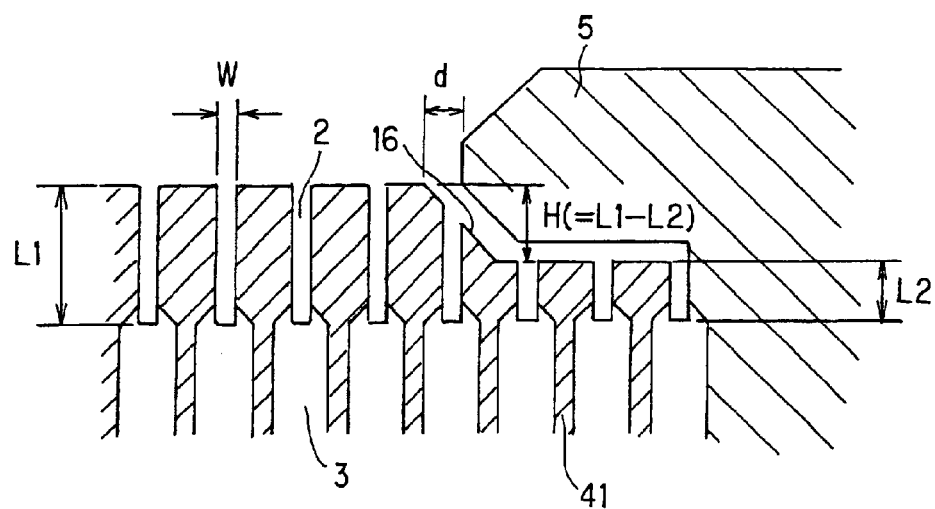
FIG. 13 is a partial sectional view of the honeycomb structure molding apparatus used in Example 7 and Comparative Example 7 in which the level difference part has an inclined plane of about 45°.

Extrusion molding was carried out using the resulting molding material by a honeycomb structure molding apparatus as shown in FIG. 13 provided with a spinneret 41 having the level difference part 16 having an inclined plane of about 45° and the press plate 5, with setting the spinneret 4 and the press plate 5 so that the width of gap d between the level difference part 16 and the press plate 5 on the most downstream side was 0.35 mm, and evaluation on failure in formation of cells was conducted.

As for slits 2 provided in the spinneret 4, the slit width W was 0.075 mm, the slit length L1 of the inner side part was 3.0 mm, and the slit length L2 of the outer periphery part was 0.8 mm, and cell density of the resulting molded body was 0.65 cell/mm$^2$.

EXAMPLE 8

Extrusion molding was carried out in the same manner as in Example 1, except that the slit width W of the slit 2 provided in the spinneret 4 was 0.075 mm, the slit length L1 of the inner side part was 2.0 mm, and the slit length L2 of the outer periphery part was 0.6 mm, and evaluation on failure in formation of cells was conducted.

EXAMPLE 9

Extrusion molding was carried out in the same manner as in Example 1, except that the slit width W of the slit 2 provided in the spinneret 4 was 0.100 mm, the slit length L1 of the inner side part was 5.0 mm, and the slit length L2 of the outer periphery part was 1.0 mm, and evaluation on failure in formation of cells was conducted.

EXAMPLE 10

Extrusion molding was carried out in the same manner as in Example 1, except that a spinneret 4 for obtaining a molded body having a cell density of 1.86 cells/mm$^2$, and evaluation on failure in formation of cells was conducted.

COMPARATIVE EXAMPLE 1

Extrusion molding was carried out in the same manner as in Example 1, except that the slit length L2 of the slit 2 of the outer periphery part provided in the spinneret 4 was 0.7 mm, and evaluation on failure in formation of cells was conducted.

COMPARATIVE EXAMPLE 2

Extrusion molding was carried out in the same manner as in Example 1, except that the slit length L2 of the slit 2 of the outer periphery part provided in the spinneret 4 was 2.7 mm, and evaluation on failure in formation of cells was conducted.

COMPARATIVE EXAMPLE 3

Extrusion molding was carried out in the same manner as in Example 1, except that the slit width W of the slit 2 provided in the spinneret 4 was 0.075 mm, and the slit length L2 of the outer periphery part was 0.4 mm, and evaluation on failure in formation of cells was conducted.

COMPARATIVE EXAMPLE 4

Extrusion molding was carried out in the same manner as in Example 1, except that the slit width W of the slit 2 provided in the spinneret 4 was 0.075 mm, and the slit length L2 of the outer periphery part was 2.7 mm, and evaluation on failure in formation of cells was conducted.

COMPARATIVE EXAMPLE 5

Extrusion molding was carried out in the same manner as in Example 1, except that the slit width W of the slit 2 provided in the spinneret 4 was 0.100 mm, and the slit length L2 of the outer periphery part was 0.3 mm, and evaluation on failure in formation of cells was conducted.

COMPARATIVE EXAMPLE 6

Extrusion molding was carried out in the same manner as in Example 1, except that the slit width W of the slit 2 provided in the spinneret 4 was 0.100 mm, and the slit length L2 of the outer periphery part was 2.7 mm, and evaluation on failure in formation of cells was conducted.

COMPARATIVE EXAMPLE 7

Extrusion molding was carried out using the resulting molding material by a honeycomb structure molding apparatus as shown in FIG. 13 provided with a spinneret 41 having the level difference part 16 having an inclined plane of about 45° and the press plate 5, with setting the spinneret 4 and the press plate 5 so that the width of gap d between the level difference part 16 and the press plate 5 on the most downstream side was 0.35 mm, and evaluation on failure in formation of cells was conducted.

As for slits 2 provided in the spinneret 4, the slit width W was 0.075 mm, the slit length L1 of the inner side part was 3.0 mm, and the slit length L2 of the outer periphery part was 0.4 mm, and cell density of the resulting molded body was 0.65 cell/mm².

COMPARATIVE EXAMPLE 8

Extrusion molding was carried out in the same manner as in Example 1, except that the slit width W of the slit 2 provided in the spinneret 4 was 0.075 mm, the slit length L1 of the inner side part was 2.0 mm, and the slit length L2 of the outer periphery part was 0.3 mm, and evaluation on failure in formation of cells was conducted.

COMPARATIVE EXAMPLE 9

Extrusion molding was carried out in the same manner as in Example 1, except that the slit width W of the slit 2 provided in the spinneret 4 was 0.100 mm, the slit length L1 of the inner side part was 5.0 mm, and the slit length L2 of the outer periphery part was 0.5 mm, and evaluation on failure in formation of cells was conducted.

Evaluation

Results of the above Examples 1–10 and Comparative Examples 1–9 are shown in Table 2. As can be seen from Table 2, in the case of being within the specific ranges, namely, when the slit width W (mm), the slit length L1 (mm) of the inner side part, and the slit length L2 (mm) of the outer periphery part satisfy both the following two formulas, failure in formation of cells can be diminished as compared with in the case of being outside the ranges.

$$L1-L2 \geq 0.4 \text{ mm} \quad (1)$$

$$L2 \geq 0.015/W \times L1 \quad (2)$$

TABLE 2

| | Slit length L1 in Inner Side (mm) | Slit length L2 in Outer Peripheral Part (mm) | Slit Width W (mm) | Cell Density (cells/cm²) | L1 − L2 | 0.015/ W × L1 (mm) |
|---|---|---|---|---|---|---|
| Exam. 1 | 3.0 | 1.0 | 0.050 | 0.65 | 2.0 | 0.90 |
| Exam. 2 | 3.0 | 2.0 | 0.050 | 0.65 | 1.0 | 0.90 |
| Exam. 3 | 3.0 | 0.8 | 0.075 | 0.65 | 2.2 | 0.60 |
| Exam. 4 | 3.0 | 2.0 | 0.075 | 0.65 | 1.0 | 0.60 |
| Exam. 5 | 3.0 | 0.6 | 0.100 | 0.65 | 2.4 | 0.45 |
| Exam. 6 | 3.0 | 2.0 | 0.100 | 0.65 | 1.0 | 0.45 |
| Exam. 7 | 3.0 | 0.8 | 0.075 | 0.65 | 2.2 | 0.60 |
| Exam. 8 | 2.0 | 0.6 | 0.075 | 0.65 | 1.4 | 0.40 |
| Exam. 9 | 5.0 | 1.0 | 0.100 | 0.65 | 4.0 | 0.75 |
| Exam. 10 | 3.0 | 2.0 | 0.075 | 1.86 | 1.0 | 0.60 |
| Com. Ex. 1 | 3.0 | 0.7 | 0.050 | 0.65 | 2.3 | 0.90 |
| Com. Ex. 2 | 3.0 | 2.7 | 0.050 | 0.65 | 0.3 | 0.90 |
| Com. Ex. 3 | 3.0 | 0.4 | 0.075 | 0.65 | 2.6 | 0.60 |
| Com. Ex. 4 | 3.0 | 2.7 | 0.075 | 0.65 | 0.3 | 0.60 |
| Com. Ex. 5 | 3.0 | 0.3 | 0.100 | 0.65 | 2.7 | 0.45 |
| Com. Ex. 6 | 3.0 | 2.7 | 0.100 | 0.65 | 0.3 | 0.45 |
| Com. Ex. 7 | 3.0 | 0.4 | 0.075 | 0.65 | 2.6 | 0.60 |
| Com. Ex. 8 | 2.0 | 0.3 | 0.075 | 0.65 | 1.7 | 0.40 |
| Com. Ex. 9 | 5.0 | 0.5 | 0.100 | 0.65 | 4.5 | 0.75 |

| | Angle of level difference part | Twist of cells | Rupture of cells | Omission of cells |
|---|---|---|---|---|
| Exam. 1 | 90° | None | None | None |
| Exam. 2 | 90° | None | None | None |
| Exam. 3 | 90° | None | None | None |
| Exam. 4 | 90° | None | None | None |
| Exam. 5 | 90° | None | None | None |
| Exam. 6 | 90° | None | None | None |
| Exam. 7 | 45° | None | None | None |
| Exam. 8 | 90° | None | None | None |
| Exam. 9 | 90° | None | None | None |
| Exam. 10 | 90° | None | None | None |
| Com. Ex. 1 | 90° | None | None | Present |
| Com. Ex. 2 | 90° | Present | Present | None |
| Com. Ex. 3 | 90° | None | None | Present |
| Com. Ex. 4 | 90° | Present | Present | None |
| Com. Ex. 5 | 90° | None | None | Present |
| Com. Ex. 6 | 90° | Present | Present | None |
| Com. Ex. 7 | 45° | None | None | Present |
| Com. Ex. 8 | 90° | None | None | Present |
| Com. Ex. 9 | 90° | None | None | Present |

As explained above, the honeycomb structure molding apparatus and the molding method of the present invention exhibit an excellent effect that a honeycomb structure having no omission of cells, provided with an outer wall of a desired thickness and having superior strength can be made. According to the honeycomb structure molding apparatus and the molding method of the present invention, when the outer wall portion which is hardly affected by passing resistance is made thicker to improved the strength, there is obtained a honeycomb structure having sufficiently practical strength even if the molding is carried out with the cell portion which is readily affected by the passing resistance being lowered in density and further thinned in wall. The resulting honeycomb structure is used suitably for purification apparatuses of exhaust gases from automobiles and very useful for inhibition of deterioration of earth environment.

What is claimed is:

1. A honeycomb structure molding apparatus for extrusion molding a honeycomb structure, said molding apparatus comprising a spinneret provided with back pores for introducing a molding material and slits for extruding the molding material, and a press plate for fixing the spinneret, the spinneret comprising an inner side part and an outer peripheral part, the inner side part protruding to a downstream side to form a level difference part between the inner side part and the outer peripheral part, the press plate opposing the inner side part of the spinneret and pressing the downstream side of the outer peripheral part of the spinneret, wherein width W (mm) of the slits, length L1 (mm) of the slits of the inner side part and length L2 (mm) of the slits of the outer peripheral part satisfy the following two formulas:

$$L1-L2 \geq 0.4 \text{ mm}$$

$$L2 \geq 0.015/W \times L1.$$

2. A honeycomb structure molding apparatus according to claim 1, wherein the level difference part has an inclined plane of about 90°.

3. A honeycomb structure molding apparatus according to claim 1, wherein the width W of the slits is 50 μm to about 120 μm.

4. A honeycomb structure molding apparatus according to claim 1, wherein the honeycomb structure has a cell density of 0.65 to about 2.0 cells/cm².

5. A honeycomb structure molding apparatus according to claim 1, wherein the outer wall of the honeycomb structure has a thickness of at least about 0.3 mm.

6. A honeycomb structure molding apparatus according to claim 1, wherein the honeycomb structure is a catalyst carrier for purification of exhaust gases of automobiles.

7. A spinneret for extrusion molding a honeycomb structure which is provided with back pores for introducing a molding material and slits for extruding the molding material, characterized in that the spinneret comprises an inner aide part and an outer peripheral part, the inner side part protrudes to a downstream side to form a level difference part between the inner side part wherein the outer peripheral part, and width w (mm) of the slits, length L1 (mm) of the slits of the inner side part and length L2 (mm) of slits of the outer peripheral part satisfy the following two formulas:

$$L1-L2 \geq 0.4 \text{ mm}$$

$$L2 \geq 0.015/W \times L1.$$

* * * * *